United States Patent [19]

Akao

[11] Patent Number: 5,262,471
[45] Date of Patent: Nov. 16, 1993

[54] METHOD OF PREPARING PACKAGING MATERIAL FOR PHOTOGRAPHIC PHOTOSENSITIVE MATERIAL AND MASTERBATCH THEREFOR

[75] Inventor: Mutsuo Akao, Kanagawa, Japan

[73] Assignee: Fuji Photo Film Co., Ltd., Minami-Ashigara, Japan

[21] Appl. No.: 878,983

[22] Filed: May 6, 1992

Related U.S. Application Data

[63] Continuation of Ser. No. 438,248, Nov. 20, 1989, abandoned.

[30] Foreign Application Priority Data

Nov. 21, 1988 [JP]  Japan .................................. 63-292382

[51] Int. Cl.⁵ .................................................. C08K 3/04
[52] U.S. Cl. ..................................... 524/496; 524/495; 524/487
[58] Field of Search ................ 524/495, 496, 847, 487

[56] References Cited

U.S. PATENT DOCUMENTS

| | | | |
|---|---|---|---|
| 4,002,595 | 1/1977 | Adelman | 524/496 |
| 4,701,359 | 10/1987 | Akao | 428/35 |
| 4,871,613 | 10/1989 | Akao | 428/408 |
| 4,876,129 | 10/1989 | Akao | 428/408 |
| 5,047,462 | 9/1991 | Kehr et al. | 524/487 |
| 5,081,170 | 1/1992 | Yagi et al. | 524/99 |
| 5,115,067 | 5/1992 | Yagi et al. | 524/487 |

FOREIGN PATENT DOCUMENTS

| | | |
|---|---|---|
| 277598 | 8/1988 | European Pat. Off. |
| 1217060 | 5/1966 | Fed. Rep. of Germany |

*Primary Examiner*—Paul R. Michl
*Assistant Examiner*—Peter Szekely
*Attorney, Agent, or Firm*—Burns, Doane, Swecker & Mathis

[57] ABSTRACT

A resin composition for masterbatch, which comprises 5 to 90 wt. % of modified polyolefin resin and 5 to 70 wt. % of carbon black having a mean particle size of 15 to 120 m$\mu$ and an oil absorption value of more than 50 ml/100 g of which volatile components are less than 3.5 wt. %. The fluidity of the resin composition for masterbatch of the invention is excellent even in a high concentration of carbon black, and is uniformly dispersed in a base resin in a short time.

14 Claims, No Drawings

METHOD OF PREPARING PACKAGING MATERIAL FOR PHOTOGRAPHIC PHOTOSENSITIVE MATERIAL AND MASTERBATCH THEREFOR

This application is a continuation of application Ser. No 07/438,248, filed Nov. 20, 1989, now abandoned.

BACKGROUND OF THE INVENTION

1. Field of the Invention

This invention relates to a resin composition for masterbatch used for coloring black molded articles, such as a light-shielding film, a container for a light-shielding cartridge, a light-shielding spool, a light-shielding cassette and a light-shielding magazine.

2. Description of the Prior Art

In general, the thermoplastic resins used for coloring molded articles for photosensitive materials are colored by directly adding a coloring material such as pigment or dye to the thermoplastic resin as it is or by preparing a resin containing a coloring material in the form of pellets, flakes, beads, granules or the like. As the former method, there are the dry color method using a coloring material in solid state at ordinary temperature, the liquid color method using a coloring material in liquid state at ordinary temperature and the paste color method. While, as the later method, there are the masterbatch method (concentrate method) using the pellets containing a coloring material in a high concentration and the compound method which involves blending the total amount of a coloring material with a base resin, melting, kneading and pelletizing the resin composition in a kneading granulating machine, and molding colored resin articles using the pellets. The respective coloring methods have advantages and disadvantages, and utilize respective characteristics. Among them, the masterbatch method is superior is handling, no scattering upon a use, cost and the like. The applicant has developed a resin composition for masterbatch (Japanese Patent KOKAI No. 63-186740).

Incidentally, the blending ratio of a masterbatch resin to a thermoplastic resin used as the base resin for molded articles is reduced in order to prevent the change in the properties or to reduce cost, in molding various articles through various processes such as inflation process, T die extrusion, blow molding and injection molding. The resin composition for masterbatch must color the molded articles uniformly even in such a case. However, in the case of conventional resin compositions for masterbatch, when the light-shielding material concentration of the masterbatch resin is increased, the dispersion of the light-shielding material is inferior and agglomelation is liable to occur. Thus, the molded articles are not colored uniformly.

Moreover, film-molding time and injection molding cycle are shortened, and molded articles are rendered thinner. As a result, the masterbatch resin is required to disperse in base resins uniformly in a short time even at a low molding temperature where the degradation of the base resin is low. Therefore, it is necessary to improve the fluidity of the masterbatch resin at the molding temperature of the base resin. However, the fluidity of the masterbatch resin decreases with the increase of the carbon black concentration, and the masterbatch resin does not disperse in the base resin completely. As a result, various problems occur, such as irregular color of molded articles, fogging of photosensitive materials caused by insufficient light-shielding of the package, deviation of the color of the molded articles by the variation in the temperature and pressure of the molding machine, and the like. The above tendency is especially pronounced, in the case that the fluidity of the base resin is high.

SUMMARY OF THE INVENTION

An object of the invention is to provide a resin composition for masterbatch wherein carbon black is uniformly dispersed in a high concentration.

Another object of the invention is to provide a resin composition for masterbatch containing carbon black in a high concentration and which is capable of dispersing rapidly and uniformly in a base resin at a relatively low temperature, and light-shielding and appearance troubles such as irregular color and weld lines do not occur in the colored articles molded using the same.

The present invention provides a resin composition which has achieved the above objects, which comprises 5 to 90 wt. % of modified polyolefin resin and 5 to 70 wt. % of carbon black having a mean particle size of 15 to 120 m$\mu$ and an oil absorption value of more than 50 ml/100 g of which volatile components are less than 3.5 wt. %.

DETAILED DESCRIPTION OF THE INVENTION

The modified polyolefin resin is a polyolefin resin modified by an unsaturated carboxylic acid or a derivative thereof.

The polyolefin resin includes high pressure branched low density polyethylene resin, medium density polyethylene resin, high density polyethylene resin, linear low density polyethylene resin (ethylene-$\alpha$-olefin copolymer resin), homopolypropylene resin, propylene-ethylene random copolymer resin, propylene-ethylene block copolymer resin, propylene-$\alpha$-olefin copolymer resin, ethylene-vinyl acetate copolymer resin, ethylene-methyl acrylate copolymer resin, ethylene-ethyl acrylate copolymer resin, poly-$\alpha$-olefin resins such as polybutene-1 resin, polyisobutylene resin, poly-4-methylpentene-1 resin and polyhexene-1 resin, and the like.

The unsaturated carboxylic acid usable as the modifier of the polyolefin resin is acrylic acid, methacrylic acid, crotonic acid, isocrotonic acid, fumaric acid, maleic acid, itaconic acid, citraconic acid, angelic acid, tetrahydrophthalic acid, sorbic acid, mesaconic acid and the like. The derivatives of the unsaturated carboxylic acid are anhydrides, esters, amides, imides, acid halides, metal salts and the like, and include maleic anhydride, itaconic anhydride, citraconic anhydride, methyl acrylate, methyl methacrylate, ethyl methacrylate, ethyl acrylate, n-butyl acrylate, glycidyl acrylate, n-butyl methacrylate, isobutyl acrylate, isobutyl methacrylate, maleic acid monoethyl ester, maleic acid diethyl ester, fumaric acid monomethyl ester, fumaric acid dimethyl ester, itaconic acid monomethyl ester, itaconic acid dimethyl ester, acrylamide, methacrylamide, maleic acid monoamide, maleic acid diamide, fumaric acid monoamide, fumaric acid diamide, maleimide, sodium acrylate, sodium methacrylate, potassium acrylate, potassium methacrylate and the like. Maleic anhydride is particularly preferred. A suitable amount of the unsaturated carboxylic acid and the derivative thereof is 0.01 to 5 parts by weight, preferably 0.05 to 3 parts by weight, per 100 parts by weight of the polyolefin resin.

The modification may be carried out by a known method such as using an organic peroxide. Suitable organic peroxides are benzoyl peroxide, t-butyl perbenzoate, t-butyl acetate, t-butyl peroxyisopropyl carbonate, 2,5-dimethyl-2,5-di(benzoylperoxy)hexane, t-butyl-diperadipate, t-butylperoxy-3,5,5-trimethylhexanoate, methyl ethyl ketone peroxide, cyclohexanone peroxide, di-t-butyl peroxide and the like. 2,5-dimethyl-2,5-di(t-butylperoxy)hexane, 2,5-methyl-2,5-di(t-butylperoxy)-hexyne-3 and 1,3-bis-(t-butylperoxyisopropyl)benzene are preferred. A suitable amount, for example 0.001 to 1 part by weight of the organic peroxide is added to 100 parts by weight of the polyolefin, and kneaded together with the unsaturated carboxylic acid or the derivative thereof at a temperature of higher than the melting point of the polyolefin resin, usually at 150° to 330° C.

Since the polyoefin resin is kneaded at a relatively high temperature, to blend an antioxidant is preferred. Suitable antioxidants are 2,6-di-t-butyl-p-cresol (BHT), 4-hydroxy-2,2,6,6-tetramethylpiperidine, tetrakis(2,2,6,6-tetramethyl-4-piperidyl)-1,2,3,4-butane tetracarboxylate, 3,9-bis[1,1,-dimethyl-2-{tris(1,2,2,6,6-pentamethyl-4-piperidyloxycarbonyl)butylcarbonyloxy}ethyl]-2,4,8,10-tetraoxaspiro[5,5]undecane, bis (2,4-di-t-butylphenyl) pentaerythritoldiphosphite, tris(2,4-di-t-butylphenyl) phosphite, bis(2,6-di-t-butyl-4-methylphenyl) pentaerythritoldiphosphite, n-octadecyl-3-(3', 5'-di-t-butyl-4'-hydroxylphenyl)propionate, 2,6-di-t-butyl-4-methylphenol, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis[methylene-3-(3',5'-di-t-hydroxyphenyl)propionate] methane, stearyl-$\beta$-(3,5-di-t-butyl-4-hydroxyphenyl) propionate, tocopherols (vitamin E) and the like.

The modified polyolefin resin can be produced as above, and moreover, some modified polyolefin resins are commerically available. Examples of commerical modified polyolefin resins are MODIC (Mitsubishi Petrochemical), ADMER (Mitsui Petrochemical Industries), NOVATEC AP (Mitsubishi Chemical Industries), IDEMITSU POLYTAC (Idemitsu Petrochemical), MITSUI LONPLY (Mitsui Toatsu Chemicals), HIMIRAN (Mitsui Polychemicals) and the like. Preferable modified polyolefin resins are modified high pressure branched low density polyethylene resin, modified linear low density polyethylene resin (modified ethylene-α-olefin copolymer resin), modified high density polyethylene resin modified propylene-ethylene copolymer resin (including block type and random type), modified homopolypropylene resin, modified ethylene-vinyl acetate copolymer resin, modified ethylene-ethyl acrylate copolymer resin and the like. A suitable melt index (ASTM D-1238) of the modified polyolefin resin is more than 1 g/10 minutes, preferably more than 2 g/10 minutes, further preferably more than 3 g/10 minutes, in view of the dispersibility of carbon black.

The carbon black can be selected from graphite, lamp black, acetylene black, bone black, furnace black, channel black, thermal black and the like. The mean particle size of the carbon black is in a range of 15 to 120 m$\mu$. Carbon black having a mean particle size of less than 15 m$\mu$ is inferior in dispersibility, and is liable to aggregate, Therefore, it is difficult to color uniformly with high quality. Lumps increase, and pinholes are liable to occur in a light-shielding film. While, carbon black having a mean particle size of more than 120 m$\mu$ decreases light-shielding ability, and moreover, it is expensive. The oil absorption value of the carbon black is more than 50 ml/100 g. Carbon black having an oil absorption value of less than 50 ml/100 g is inferior in dispersibility in the resin, and lumps are liable to occur. The content of volatile components in the carbon black is less than 3.5 wt. %. When the content is beyond 3.5 wt. %, the carbon black degrades photographic photosensitive materials and induces the troubles of fogging and variation of photosensitivity. Moreover, silver streaks, foaming and the like occur in the molded articles. The content of the carbon black is 5 to 70 wt. %, preferably 15 to 50 wt. %. When the content is less than 5 wt. %, the coloring cost of the molded articles increases. While, when the content is beyond 70 wt. %, the dispersion of the carbon black is insufficient, and lumps increase. The fluidity of the masterbatch resin is also inferior.

The resin composition for masterbatch of the invention may contain other thermoplastic resins including the same resin as the base resin of the molded article.

The base resin is the principal thermoplastic resin of the molded article, and is blended with the masterbatch. Suitable base resins for the resin composition of the invention include various resins used for the packaging materials for photosensitive materials, such as linear low density polyethylene resin, LDPE resin, EVA resin, EEA resin, EAA resin, modified ethylene resin, modified propylene resin, ionomer resin, homopolypropylene resin, propylene-α-olefin random copolymer resin, propylene-α-olefin block copolymer resin, extremely low density polyethylene resin, MDPE resin, HDPE resin, polystyrene resin, polyvinyl chloride resin, polyvinylidene chloride resin, ABS resin, polyvinyl alcohol resin, saponified product of ethylene-vinyl acetate copolymer, polycarbonate resin, polyamide resin, polyester resin, and the like. Common resins for photographic photosensitive materials are linear polyethylene resin, LDPE resin, HDPE resin, EEA resin, polypropylene resin, polyamide resin, polystyrene resin and the like. Representative examples of polypropylene resin are propylene homopolymer resin, propylene-ethylene block copolymer resin, propylene-ethylene random copolymer resin, propylene-α-olefin block copolymer, propylene-α-olefin random copolymer, etc., and representative blended resins of the above polypropylene resins are the blends with various polyethylene resins, the blended resins with various inorganic fillers, the polypropylene resins of which a part or whole is modified by an unsaturated carboxylic acid such as maleic anhydride, the blended resins with various nucleating agents, the blend resins with various light-shielding materials, the blended resins with various rubbers such as EPR or EPDM, the blended resins with various thermoplastic resins other than mentioned above, the blended resins with various additives other than mentioned above such as a lubricant or dispersing agent, etc. Even when the same resin as the base resin is added to the resin composition, the content is less than 90 wt. %, preferably less than 80 wt. %. When the content is beyond 90 wt. %, the dispersion of the carbon black is inferior, unless the base resin is a modified polyolefin resin. As a result, the manufacture of inflation film is difficult by the occurrence of lumps and pinholes. Moreover, light-shielding ability and appearance are degraded.

In order to improve the dispersion of the carbon black, polyolefin wax is preferably added to the resin composition of the invention. Suitable polyolefin waxes are linear low density polyethylene wax, branched low density polyethylene wax, polypropylene wax, paraffin wax, polyisobutylene wax, carboxylic acid-containing polyolefin wax, polyolefin wax and the like, and those having a molecular weight of 500 to 20,000 are particularly preferred. A suitable content of polyolefin wax is less than 70 wt. %, preferably less than 60 wt. %. When the content is beyond 70 wt. %, it is difficult to pelletize the resin composition for masterbatch of the invention containing carbon black in a high concentration.

Moreover, it is preferable to blend a higher fatty acid and/or a higher fatty acid compound in order to improve moldability, separability of molded articles, dispersibility of carbon black into base resin, prevention of mold corrosion and the like. Suitable higher fatty acids are the saturated fatty acids and the unsaturated fatty acids having a number of carbon atoms of 6 to 34, preferably 10 to 23, and include stearic acid, oleic acid, palmitic acid, behenic acid, lauric acid, linolenic acid and erucic acid. Suitable higher fatty acid compounds are excellent in slipping character, and include metal salts (metallic soaps) of the above higher fatty acids such as magnesium salt, zinc salt, calcium salt, sodium salt, barium salt and aluminum salt, and amides of the above higher fatty acids such as oleic amide, erucic amide, stearic amide, ethylenebisstearamide and bis fatty acid amides. A suitable content of the higher fatty acid and/or the higher fatty acid compound is less than 10 wt. %. When the content is beyond 10 wt. %, they bleed out and adhere to the packaged articles such as photographic photosensitive materials, foods or medicines to induce various troubles such as development trouble in the photographic photosensitive materials. Moreover, slip occurs between screw and resin resulting in a deviation in the quantity of the extruded resin. In the case of oleic amide which is excellent in slipping character, less than 1 wt. % is preferred.

The following additives may be added to the resin composition for masterbatch of the invention to the extent capable of exhibiting the characteristics of the invention.

(1) Plasticizer; phthalic acid esters, glycol ester, fatty acid esters, phosphoric acid esters, etc.
(2) Stabilizer; lead compounds, cadmium compounds, zinc compounds, alkaline earth metal compounds, organic tin compounds, etc.
(3) Antistatic agent; cationic surfactants, anionic surfactants, nonionic surfactants, ampholytic surfactants, etc.
(4) Flame retardant; phosphoric acid esters, phosphoric acid ester halides, halides, inorganic materials, polyols containing phosphorus, etc.
(5) Filler; alumina, kaolin, clay, calcium carbonate, mica, talc, titanium oxide, silica, etc.
(6) Reinforcing agent; glass lobing, metallic fiber, glass fiber, glass milled fiber, carbon fiber, etc.
(7) Coloring agent; inorganic pigments (Al, $Fe_2O_3$, $TiO_2$, ZnO, CdS, etc.), organic pigments, dyes, etc.
(8) Blowing agent; inorganic blowing agents (ammonium carbonate, sodium hydrogen carbonate), organic blowing agents (nitroso compounds, azo compounds) etc.
(9) Vulcanizing agent; vulcanization accelerator, acceleration assistant, etc.
(10) Deterioration preventing agent, ultraviolet absorber, metal deactivator, peroxide decomposing agent, etc.
(11) Nucleating agent; organic nucleating agents, inorganic nucleating agents, etc.
(12) Coupling agent; silane compounds, titanium compounds, chromium compounds, aluminum compounds, etc.
(13) Various thermoplastic resins, elastomers, rubbers The resin composition for masterbatch of the invention may be produced by a known method such as kneading all components by a banbury mixer, a kneader, a double roll kneader, a triple roll kneader or the like and then pelletizing by a single-shaft or double-shaft extruder, or kneading the carbon black, polyolefin wax and a higher fatty acid and/or a higher fatty acid compound by the above kneader, adding the modified polyolefin resin and base resin and then pelletizing.

Such a resin composition is blended with a base resin, and molded into various colored articles, such as packaging materials or supports for photosensitive materials, particularly packaging materials for photographic photosensitive materials, by various molding methods, such as injection molding, compression molding, rotational molding and extrudion molding such as T die extrusion, blow molding, pipe die extrusion, profile extrusion and inflation film molding.

Colored molded articles suitable for the resin composition of the invention include magazine, instant film pack, plastic cartridge, cassette, spool, reel, core, reinforcing cap for core, light-shielding paper, leader paper, pigment-coated paper, neutral paper, lint-free paper, synthetic paper, nonwoven fabric, instant film unit (photosensitive material assembly), paper box in faucet type, lid-fitting type, etc., corrugated board box, light-shielding bag including flat bag, self-standing bag, gusset bag, etc., cushioning material including liner paper, foamed sheet, air cap and pad, adhesives, hot-melt adhesive, binder, adhesive tape, dampproofing material, waterproof material, marking material including ink and label, inflation film, T die film, cast film, extrusion-coated film, stretched film, uniaxially stretched film, biaxially stretched film, laminated film, coextruded film, coextruded inflation film, laminated film laminated by blocking, cross laminated film, corrugated board, light-shielding material including ribbon, curtain, light-shielding film and light-shielding pad, plastic case including container and cap for film cartridge, hinged case for microfilm, plastic case for movie, and the like. Besides, the resin composition is also applicable to the packaging materials for magnetic materials and for molded articles for electric apparatus disclosed in Japanese patent KOKAI No. 63-186740.

The fluidity of the resin composition for masterbatch of the invention is excellent even in a high concentration of carbon black, and is uniformly dispersed in a base resin in a short time. Irregular color and lumps do not occur in the molded article, and it is uniformly colored with good appearance. Physical strength and light-shielding are excellent.

EXAMPLES

Example 1

39.7 wt. % of modified EVA resin being the modified polyolefin resin ("ADMER VE 300", Mitsui Petrochemical Industries) having a MI of 9.0 g/10 minutes and a density of 0.95 g/cm$^3$, 40 wt. % of furnace carbon black ("MITSUBISHI CARBON BLACK FOR COLOR #44", Mitsubishi Chemical Industries) having a mean particle size of 21 mµ, a pH of 8.0 and an oil absorption value of 76 ml/100 g and containing 0.8 wt. % of volatile components, 20 wt. % of L-LDPE wax having a molecular weight of about 2,000 and 0.3 wt. % of calcium stearate were sufficiently mixed with each other by a high speed mixer. The mixture was extruded in strand by a double-shaft extruder ("POM 30", Ikegai Corp.), and pelletized by a pelletizer to obtain a resin composition for masterbatch containing 40 wt. % of carbon black.

7.5 wt. % of the above pellets were mixed well with 92.5 wt. % of L-LDPE resin pellets ("ULTZEX 2021L", Mitsui Petrochemical Industries) having a MI of 2.1 g/10 minutes and a density of 0.920 g/cm$^3$. The resin pellets mixture was supplied to an inflation film molding machine (100 mm ring die, Placo Co.), and was molded into a light-shielding film 50 μm in thickness containing 3 wt. % of carbon black. Carbon black was uniformly dispersed in the film, and lumps, fish eyes and pinholes rarely occurred. The film was excellent in light-shielding, physical strength, heat sealing properties and film moldability, did not affect various photographic photosensitive materials adversely, and was suitable for moistureproof light-shielding bags having antistatic property.

EXAMPLE 2

0.5 wt. % of the carbon black masterbatch resin pellets obtained in Example 1 was mixed well with 99.5 wt. % of LDPE resin pellets having a MI of 25 g/10 minutes and a density of 0.926 g/cm$^3$. Using the above resin pellets mixture, caps for photographic film cartridge corresponding to FIG. 2 of Japanese Patent KOKAI No. 63-193143 were molded by an injection molding machine ("IS 75E", Toshiba Machine) at a mold clamping pressure of 75 t. The number molded per cycle was 2, and the type of runner was a hot runner. Carbon black was uniformly dispersed in the caps. The caps were excellent in injection moldability, and did not affect negative photographic film ("FUJICOLOR HR 100", Fuji Photo Film) adversely such as by fogging.

EXAMPLE 3

2.5 wt. % of the carbon black masterbatch resin pellets obtained in Example 1 was mixed well with 97.3 wt. % of propylene-ethylene random copolymer resin having a MI of 40 g/10 minutes, a density of 0.900 g/cm$^3$ and an ethylene unit content of 2 wt. % and 0.2 wt. % of dibenzylidene sorbitol as an organic nucleating agent. Using the above resin pellets mixture, container bodies for photographic film cartridge corresponding to FIG. 1 of Japanese Patent KOKAI No. 63-204252 were molded by an injection molding machine ("NETSTAL", Sumitomo Heavy Industries) at a mold clamping pressure of 150 t. The number per cycle was 24, and the type of runner was a hot runner. The molded container body was cylindrical, and had a mean wall thickness of 0.7 mm. The content of carbon black was 0.4 wt. %. The molded container bodies were colored uniformly, and the occurrence of weld lines short shots, stringiness and gate marks was rare. The container bodies did not affect negative photographic film ("FUJICOLOR HR 100", Fuji Photo Film) adversely such as by fogging.

EXAMPLE 4

2.5 wt. % of the carbon black masterbatch resin pellets obtained in Example 1 was mixed well with 87.3 wt. % of the same propylene-ethylene random copolymer resin as Example 3 having a MI of 40 g/10 minutes, a density of 0.900 g/cm$^3$ and an ethylene unit content of 2 wt. %, 10 wt. % of linear low density polyethylene resin ("ULTZEX 25100J", Mitsui Petrochemical Industries) being a copolymer of ethylene and 4-methylpentene-1 having a MI of 10 g/10 minutes and a density of 0.925 g/cm$^3$ and 0.2 wt. % of dibenzylidene sorbitol being an organic nucleating agent. Using the above resin pellets mixture, hinged microfilm cases corresponding to FIG. 3 of Japanese Utility Model KOKAI No. 54-100617 were molded by an injection molding machine ("NETSTAL", Sumitomo Heavy Industries) at mold clamping pressure of 150 t. The number mold per cycle was 2, and the type of runner was a cold runner. The mold releasability of the molded cases were good. The molded cases were colored uniformly, and the occurrence of warpage, weld lines, bottom sink marks and short shots was rare. They were excellent in light-shielding and fit sealability, and had a high commercial value suitable for placing photographic photosensitive materials such as microfilms and instant films.

EXAMPLE 5

Except that the modified EVA resin was replaced by maleic anhydride graft modified polyethylene resin having a MI of 10 g/10 minutes and a density of 0.92 g/cm$^3$, the same resin composition as Example 1 was used, and a light-shielding film 50 μm in thickness containing 3 wt. % of carbon black was molded using the same inflation film molding machine. Carbon black was uniformly dispersed in the film, and lumps occurred rarely. Fish eyes and pinholes did not occur. The film was excellent in light-shielding, physical strength, heat sealing properties and film moldability, did not affect various photographic photosensitive materials adversely such as by fogging, and was suitable for moistureproof light-shielding bags having antistatic property.

When each article was molded using the above masterbatch resin composition in the same manner as Examples 2 to 4, every molded product was excellent in moldability, uniform coloring, physical strength and appearance.

EXAMPLE 6

Except that the modified EVA resin was replaced by modified L-LDPE resin ("ADMER NE 050", Mitsui Petrochemical Industries) having a MI of 3.5 g/10 minutes and a density of 0.93 g/cm$^3$, the same resin composition as Example 1 was used, and a light-shielding film 50 μm in thickness containing 3 wt. % of carbon black was molded using the same inflation film molding machine. Carbon black was uniformly dispersed in the film, and lumps occurred rarely. Fish eyes and pinholes did not occur. The film was excellent in light-shielding, physical strength, heat sealing properties and film moldability, did not affect various photographic photosensitive materials adversely, and was suitable for moistureproof light-shielding bags having antistatic property.

When each article was molded using the above masterbatch resin composition in the same manner as Examples 2 to 4, every molded product was excellent in moldability, uniform coloring, physical strength and appearance.

EXAMPLE 7

29.5 wt. % of modified PP resin which was the modified polyolefin resin ("MODIC P300M", Mitsubishi Petrochimical) having a MI of 10 g/10 minutes and a density of 0.89 g/cm$^3$, 40 wt. % of furnace carbon black ("MITSUBISHI CARBON BLACK FOR COLOR #40", Mitsubishi Chemical Industries) having a mean particle size of 20 mμ, a pH of 8.0 and an oil absorption value of 110 ml/100 g and containing 0.8 wt. % of volatile components, 20 wt. % of low density polyethylene wax ("HIWAX 4400G", Mitsui Petrochemical Industries) having a molecular weight of about 4,000, 0.3 wt. % of zinc stearate and 0.2 wt. % of oleic amide were sufficiently mixed with each other by a high speed mixer. The mixture was extruded in strand by a double-shaft extruder ("POM 30", Ikegai Corp.), and pelletized by a pelletizer to obtain a resin composition for masterbatch containing 40 wt. % of carbon black.

Using the above masterbatch resin pellets instead of the carbon black masterbatch resin pellets obtained in Example 1, a resin pellets mixture was prepared in the same manner as in Example 4, and hinged microfilm cases were molded by the same injection molding machine under the same conditions as Example 4. The molded hinged cases have superior qualities to those obtained in Example 4.

When each article was molded using the above resin composition for masterbatch containing the modified PP resin in the same manner as Examples 1 to 3, every molded product was excellent in moldability, uniform coloring, physical strength and appearance.

I claim:

1. A method of preparing packaging material for photographic photosensitive material comprising blending a base resin with a masterbatch resin composition which comprises 5 to 90 wt. % of modified polyolefin resin that has been modified by grafting an unsaturated carboxylic acid or derivative to a polyolefin resin in an amount of 0.01 to 5 parts by weight per 100 parts by weight of the polyolefin resin, said modified polyolefin resin having a melt index MI of more than 1 g/10 minutes, 5 to 70 wt. % of carbon black having a mean particle size of 15 to 120 mμ and an oil absorption value of more than 50 ml/100 g of which volatile components are less than 3.5 wt. % and polyolefin wax having a number average molecular weight of 500 to 20,000 in an amount of less than 70 wt. % and forming the resulting blend into packaging material for photographic photosensitive material.

2. The method of claim 1 wherein said modified polyolefin resin is a member selected from the group consisting of modified high pressure branched low density polyethylene resin, modified linear low density polyethylene resin, modified high density polyethylene resin, modified propylene-ethylene copolymer resin, modified homopolypropylene resin, modified ethylene-vinyl acetate copolymer resin, modified ethylene-ethyl acrylate copolymer resin, and modified ethylene methyl acrylate copolymer resin.

3. The method of claim 1 wherein the masterbatch resin composition further contains an antioxidant.

4. The method of claim 1 wherein the masterbatch resin composition further contains a higher fatty acid, a higher fatty acid compound or a mixture thereof.

5. A method of producing a masterbatch to be used for a packaging material for photographic photosensitive materials which comprises forming a mixture of a resin composition containing at least 5 to 90 wt. % of modified polyolefin resin obtained by blending 100 parts by weight of a polyolefin resin with 0.001 to 1 part by weight of organic peroxide, 0.01 to 5 parts by weight of unsaturated carboxylic acid or a derivative thereof, said modified polyolefin resin having a melt index of more than 1 g/10 minutes, 5 to 70 wt. % of carbon black having a mean particle size of 15 to 120 μm and an oil absorption value of more than 50 ml/100 g of which volatile components are less than 3.5 wt. % and polyolefin wax having a number average molecular weight of 500 to 20,000 in an amount of less than 70 wt. % by a mixer, and pelletizing the mixture with an extruder.

6. The method of claim 5 wherein the mixture is formed by kneading at 150° to 330° C.

7. The method of claim 5 wherein the resin composition contains an antioxidant.

8. The method of claim 7 wherein the resin composition further contains a higher fatty acid, a higher fatty acid compound or a mixture thereof.

9. The method of claim 5 wherein the resin composition further contains a higher fatty acid, a higher fatty acid compound or a mixture thereof.

10. The method of claim 1 wherein the polyolefin wax is a member selected from the group consisting of linear low density polyethylene wax, branched low density polyethylene wax, polypropylene wax, paraffin wax, polyisobutylene wax, and carboxylic acid-containing polyolefin wax.

11. The method of claim 1 wherein the base resin is a member selected from the group consisting of linear low density polyethylene resin, low density polyethylene resin, ethylene-vinyl acetate resin, ethylene-ethyl acrylate resin, ethylene-acrylic acid resin, ionomer resin, homopolypropylene resin, propylene-α-olefin random copolymer resin, propylene-α-olefin block copolymer resin, extremely low density polyethylene resin, middle density polyethylene resin, high density polyethylene resin, polystyrene resin, polyvinyl chloride resin, polyvinylidene chloride resin, acrylonitrile-butadiene-styrene resin, polyvinyl alcohol resin, saponified product of ethylene-vinyl acetate copolymer, polycarbonate resin, polyamide resin and polyester resin.

12. The method of claim 1 wherein the base resin is a member selected from the group consisting of linear polyethylene resin, low density polyethylene resin, high density polyethylene resin, ethylene-ethyl acrylate resin, polypropylene resin, polyamide resin and polystyrene resin.

13. The method of claim 1 wherein the masterbatch composition consists essentially of the modified polyolefin resin, the carbon black and the polyolefin wax.

14. The method of claim 1 wherein the masterbatch comprises 15 to 50 wt. % of carbon black.

* * * * *